US011440978B2

(12) United States Patent
Wenzel et al.

(10) Patent No.: US 11,440,978 B2
(45) Date of Patent: Sep. 13, 2022

(54) POLYMER DISPERSIONS, THEIR PREPARATION AND USE

(71) Applicant: CELANESE INTERNATIONAL CORPORATION, Irving, TX (US)

(72) Inventors: Kerstin Wenzel, Wiesbaden-Delkenheim (DE); Matthias Junk, Alsbach-Hähnlein (DE); Thomas Fichtner, Dalheim (DE); Stephan Krieger, Hofheim (DE)

(73) Assignee: CELANESE INTERNATIONAL CORPORATION, Irving, TX (US)

( * ) Notice: Subject to any disclaimer, the term of this patent is extended or adjusted under 35 U.S.C. 154(b) by 98 days.

(21) Appl. No.: 17/250,136

(22) PCT Filed: May 30, 2019

(86) PCT No.: PCT/US2019/034643
§ 371 (c)(1),
(2) Date: Dec. 4, 2020

(87) PCT Pub. No.: WO2019/236375
PCT Pub. Date: Dec. 12, 2019

(65) Prior Publication Data
US 2021/0230315 A1    Jul. 29, 2021

Related U.S. Application Data

(60) Provisional application No. 62/681,775, filed on Jun. 7, 2018.

(51) Int. Cl.
| | |
|---|---|
| *C08K 3/013* | (2018.01) |
| *C08F 220/06* | (2006.01) |
| *C08F 2/22* | (2006.01) |
| *C08F 218/08* | (2006.01) |
| *C08F 218/10* | (2006.01) |
| *C08F 220/14* | (2006.01) |
| *C08F 230/08* | (2006.01) |
| *C08F 220/18* | (2006.01) |
| *C08F 2/00* | (2006.01) |
| *C09D 5/02* | (2006.01) |

(52) U.S. Cl.
CPC ............... *C08F 2/22* (2013.01); *C08F 2/001* (2013.01); *C08F 218/08* (2013.01); *C08F 218/10* (2013.01); *C08F 220/06* (2013.01); *C08F 220/14* (2013.01); *C08F 220/1808* (2020.02); *C08F 230/085* (2020.02); *C08K 3/013* (2018.01); *C09D 5/02* (2013.01); *C08F 2800/20* (2013.01)

(58) Field of Classification Search
CPC ........ C08K 3/013; C08F 2/22; C08F 230/085; C08F 220/1808; C08F 2/001; C08F 218/08; C08F 218/10; C08F 220/06; C08F 220/14; C08F 2800/20; C09D 5/02
USPC .......................................................... 524/458
See application file for complete search history.

(56) References Cited

U.S. PATENT DOCUMENTS

| | | | |
|---|---|---|---|
| 2005/0107527 A1* | 5/2005 | Holub | C09D 133/04 524/817 |
| 2009/0043035 A1 | 2/2009 | Cabrera | |
| 2009/0069495 A1 | 3/2009 | Fichtner et al. | |
| 2009/0203814 A1 | 8/2009 | Petri et al. | |
| 2012/0029142 A1* | 2/2012 | de Castro | C08F 263/02 526/75 |
| 2012/0077030 A1* | 3/2012 | Gerst | C09J 121/02 524/460 |
| 2014/0350172 A1 | 11/2014 | Belmonte Rodrigues De Castro et al. | |
| 2015/0203676 A1* | 7/2015 | Li | C08F 290/062 524/522 |

FOREIGN PATENT DOCUMENTS

| | | |
|---|---|---|
| EP | 308735 A2 | 3/1989 |
| GB | 1253999 A | 11/1971 |

OTHER PUBLICATIONS

International Search Report and Written Opinion issued in the corresponding Patent Application No. PCT/US2019/034643 dated Aug. 13, 2019.

* cited by examiner

*Primary Examiner* — Kelechi C Egwim
(74) *Attorney, Agent, or Firm* — Roberts Calderon Safran & Cole P.C.

(57) ABSTRACT

A multistage emulsion polymerization process comprises polymerizing a first monomer composition comprising from 50 to 95 weight percent of vinyl acetate, from 5 to 40 weight percent of at least one vinyl ester of a $C_5$ to $C_{18}$ unsaturated carboxylic acid, and optionally up to 40 weight percent of ethylene, all based on the total weight of monomers in the first monomer composition, to produce a first stage polymer. A second monomer composition comprising 40 to 89.95 weight percent of at least one ester of methacrylic acid or a vinyl aromatic monomer, 10 to 59.95 weight percent of at least one ester of acrylic acid, and from 0.05 to 10 weight percent of at least one comonomer with acid functionality, based on the total weight of monomers in the second monomer composition, is then polymerized in the presence of the first stage polymer to produce a second stage polymer.

30 Claims, No Drawings

POLYMER DISPERSIONS, THEIR PREPARATION AND USE

CROSS-REFERENCE TO RELATED APPLICATIONS

The present application is a U.S. National Phase of PCT/US2019/034643 filed on May 30, 2019 claiming priority to the U.S. provisional patent application No. 62/681,775 filed on Jun. 7, 2018. The disclosure of the PCT Application is hereby incorporated by reference into the present Application.

FIELD

The present invention relates to polymer dispersions, their preparation and use. More particularly, this invention relates to vinyl ester/acrylic multistage polymer dispersions demonstrating enhanced resistance to whitening, reduced water take up, and reduced water permeability when cast as unformulated polymer film or when used, for example, as a binder in paints and plasters.

BACKGROUND

Polymer dispersions derived from vinyl esters and monomers copolymerizable therewith and their use as binders for paints and plasters are known and have already been described many times. Such polymer dispersions are typically prepared by emulsion polymerization; with the polymerization being effected in one or more stages. In the polymerization processes which have become known to date, vinyl ester-containing monomer mixtures are converted by free-radical polymerization by addition of initiators in the presence of protective colloids and/or emulsifiers. Vinyl ester-based, and particularly vinyl acetate-based copolymer dispersions, produced in one polymerization stage offer a good balance of block resistance and low temperature film formation due to the hydroplastification effect of vinyl acetate, rendering them suitable binders for low-emission interior paints. On the downside, the hydrophilicity and relatively low glass transition temperature of poly(vinyl acetate) of 32° C. render vinyl ester-based copolymer dispersions less suitable for exterior applications due to insufficient resistance to dirt pickup and/or water resistance. To date, several publications have proposed a multiphase polymerization process to overcome these deficiencies. After polymerizing a vinyl ester-based first stage polymer with a low glass transition temperature and suitable for coalescent-minimized or coalescent-free low temperature film formation, a second monomer mixture with a preferably elevated glass transition temperature is polymerized to be incorporated in the preformed particles.

For example, U.S. Patent Application Publication No. 2009/0069495 to Fichtner et al. ("Fichtner") is directed to coating compositions comprising binders based on polyvinyl ester dispersions prepared by a multistage polymerization process. In a first stage, a polyvinyl ester dispersion is prepared by polymerizing at least one vinyl ester of a saturated carboxylic acid (and optionally further monomers copolymerizable therewith) in the presence of at least one emulsifier and/or at least one protective colloid. In a second stage, monomers in a dissolved form, a pure form, or in the form of an emulsion are added to the reaction mixture and polymerized. The polyvinyl ester dispersions of Fichtner comprise polymerized silanes and/or epoxides, and are said to offer high weathering resistance when used in plasters, or exterior coatings, like façade paints and wood protection paints and dispersion based paints. However, the dispersions of Fichtner suffer from the disadvantage of producing coatings with high water permeability.

U.S. Patent Application Publication No. 2009/0203814 to Petri et al. ("Petri") discloses multistage polymers derived from hard and soft monomer compositions containing vinyl esters, of which at least one monomer composition must contain an unsaturated organosilicon compound. The dispersions of Petri are suitable for the formation of solvent-free coating materials which exhibit little foam formation and are said to offer improved blocking resistance, gloss and abrasion resistance in coatings produced therewith. However, the dispersions of Petri suffer from the disadvantage of a high dirt pick behavior when those dispersions are used in exterior façade paints and exterior plasters.

U.S. Patent Application Publication No. 2009/0043035 to Cabrera ("Cabrera") discloses polyvinyl ester dispersions suitable for use as binders for paints which have a low content (less than 6 wt % based on the total amount of monomers) of polymerized acids or acid anhydrides. The dispersions are prepared by a multistage process in which a polyvinyl ester dispersion is obtained in a first stage, monomers in dissolved or pure form are added to the reaction mixture in a second stage and then the polymerization is started again. The polymer dispersions obtained in this way are said to be notable for a low coagulum content and for increased tensile strengths of the films formed therefrom. In addition, coatings produced from paints using these dispersions are said to have a weathering stability comparable to the emulsion paints comprising binders based on polyacrylate.

British Patent Application Publication No. GB1253999A discloses a process for preparing an aqueous film-forming latex, wherein a pre-formed latex prepared by aqueous emulsion copolymerisation of (a) one or more vinyl esters of saturated unbranched aliphatic mono-carboxylic acids, which acids contain 2 to 4 carbon atoms with (b) one or more vinyl esters of branched saturated aliphatic mono-carboxylic acids of which the carboxyl groups are attached to tertiary and/or quaternary carbon atoms and which acids contain not less than 9 carbon atoms, is subjected to at least one further polymerisation step by mixing the pre-formed latex with an ethylenically unsaturated monomer or mixture of ethylenically unsaturated monomers, the monomer or monomers being different from the monomer precursors of the pre-formed latex, and subsequently causing the monomer or monomers to polymerize, the or at least one of the admixed monomers being so chosen that if polymerized in the absence of the pre-formed latex but in the presence of any other admixed monomer it yields a homopolymer or copolymer having a glass transition temperature higher than that of polyvinyl acetate. Suitable monomers mixed with the preformed latex comprise styrene, methyl methacrylate, acrylonitrile, vinyl chloride, or a mixture of two or more thereof.

U.S. Patent Application Publication No. 2014/0350172 to Belmonte Rodrigues De Castro et al. ("De Castro") discloses a multi-stage emulsion polymerization process, in which a first monomer composition comprising from about 60 weight percent to about 95 weight percent of at least one vinyl ester, and from about 5 weight percent to about 40 weight percent ethylene is polymerized in a first stage under ethylene pressure to produce a first stage product having a $T_g$ of less than 20° C. Then, in a second stage, a second monomer composition comprising at least 95 weight percent of a meth(acrylic) ester or a mixture of at least two different (meth)acrylic esters is polymerized in the presence of said first stage product, wherein the (meth)acrylic ester(s) is selected such that the polymer produced by said second monomer composition has a $T_g$ of 5 to 90° C. The resultant copolymer dispersion is said to demonstrate enhanced wet scrub resistance, enhanced color retention, low water take up, low dirt pick up, high color retention and superior fire retardant properties when used in paints and plasters. However, the water resistance of pristine coatings comprising said copolymer dispersions was poor as evidenced by high liquid water transmission rates during the first conditioning.

European Patent Publication No. 308735 discloses an aqueous plastic dispersion consisting of a core-shell polymer and emulsifiers, characterized by a core-shell polymer having a glass transition temperature of the core of −35° C. to +20° C. of the following composition, based on polymer solid, in the core Ka) 45-95 wt. % of one or more vinyl esters of monocarboxylic acids having 1 to 13 carbon atoms, and/or one or more maleic diesters of a straight or branched chain alkanol having 1 to 8 carbon atoms, and/or one or more (meth)acrylic acid ester of a straight or branched chain alkanol having 1 to 10 carbon atoms; Kb) 0-5% by weight of an alpha, beta-unsaturated monocarboxylic acid having 3 to 4 carbon atoms, and/or an unsaturated dicarboxylic acid having 4 to 6 carbon atoms, or a mixture of such acids; Kc) 0-5% by weight of an alpha, beta-unsaturated monocarboxylic acid amide having 3 to 4 carbon atoms, and/or an unsaturated dicarboxylic acid amide having 4 to 6 carbon atoms or a mixture of such acid amides; Kd) 0-5% by weight of a (meth)acrylic acid monoester of a straight- or branched-chain alkanediol or polyol having 2 to 10 carbon atoms; Ke) 0-5% by weight of a N-methylol (meth)acrylamide etherified with a straight or branched chain alkanol having 1 to 4 carbon atoms; Kf) 0-3% by weight of a vinyltrialkoxysilane of a straight- or branched-chain alkanol having 1 to 4 carbon atoms and/or a (meth)acrylic ester of a straight- or branched-chain trialkoxysilylethanol or -propanol having 1 to 4 carbon atoms per alkoxy group; and in the shell Sa) 3-15% by weight of an aromatic vinylbenzene which may be substituted with straight or branched chain alkyl groups of a carbon number of 1 to 4 in the ring or the vinyl group; Sb) 1-10% by weight of an alpha, beta-unsaturated monocarboxylic acid having 3 to 4 carbon atoms and/or an unsaturated dicarboxylic acid having 4 to 6 carbon atoms, or a mixture of such acids; Sc) 0-3% by weight of an alpha, beta-unsaturated monocarboxylic acid amide having 3 to 4 carbon atoms and/or an unsaturated dicarboxylic acid amide having 4 to 6 carbon atoms or a mixture of such acid amides; Sd) 0-5% by weight of a (meth)acrylic acid monoester of a straight or branched chain alkanediol or polyol having 2 to 10 carbon atoms; Se) 0-5% by weight of a N-methylol (meth)acrylamide etherified with a straight or branched chain alkanol having 1 to 4 carbon atoms; Sf) 0-3% by weight of a vinyltrialkoxysilane of a straight- or branched-chain alkanol having 1 to 4 carbon atoms and/or of a (meth)acrylic acid ester of a straight- or branched-chain trialkoxysilylethanol or -propanol having 1 to 4 carbon atoms per alkoxy group. Such polymer dispersions are said to have excellent properties when used as construction adhesives.

Notwithstanding the availability of the above-described multiphase polymer dispersions, there remains a continuing need for vinyl ester-based polymer dispersions which offer enhanced performance over existing compositions when used in, for example, paints and plasters. By way of example, significant disadvantages of current dispersions for use in exterior façade paints and plasters are high gravimetric water take up, high water permeability, measured as liquid water transmission rate (w-value) according to DIN EN-1062-3 of pristine and/or aged coatings, and significant whitening when exposed to moisture. Therefore, it would be useful to provide polymer dispersions capable of use in, for example, paints and plasters, that offer reduced water take up and whitening, without loss of properties in other performance areas, such as low temperature film formation and a high dirt-pickup resistance.

SUMMARY

According to the invention, it has now been found that vinyl acetate/acrylic multistage polymer dispersions exhibiting enhanced resistance to whitening and reduced water take up when used in paints and plasters can be produced by the addition of controlled amounts of vinyl esters of longer chain carboxylic acids to the first stage polymer and comonomers with acid functionality to the second or inclusion phase polymer.

Thus, in one aspect, the invention resides in an emulsion polymerization process comprising:

(i) polymerizing, in a first stage, a first monomer composition comprising from 50 weight percent to 95 weight percent of vinyl acetate, from 5 weight percent to 40 weight percent of at least one vinyl ester of a $C_5$ to $C_{18}$ unsaturated carboxylic acid, optionally up to 40 weight percent of ethylene, optionally up to 40 weight percent of at least one ester of acrylic acid, and optionally up to 20 weight percent of one or more further monomers copolymerizable therewith, all based on the total weight of monomers in the first monomer composition, to produce a first stage polymer; and (ii) polymerizing, in a second stage and in the presence of said first stage polymer, a second monomer composition comprising 40 weight percent to 89.95 weight percent of at least one ester of methacrylic acid or a vinyl aromatic monomer, 10 weight percent to 59.95 weight percent of at least one ester of acrylic acid, and from 0.05 weight percent to 10 weight percent of at least one comonomer with acid functionality, based on the total weight of monomers in the second monomer composition, to produce a second stage polymer, wherein the weight ratio of the first stage polymer to the second stage polymer is from 95:5 to 25:75.

In further aspects the invention resides in a copolymer dispersions produced by the process described herein and use of the copolymer dispersions in paints e.g. façade paints, wood protection paints, interior paints and gloss paints, plasters and thermal insulation systems.

DETAILED DESCRIPTION

Described herein is a multistage emulsion polymerization process, in which a first monomer composition comprising from 50 weight percent to 95 weight percent of vinyl acetate, from 5 weight percent to 40 weight percent of at least one vinyl ester of a $C_5$ to $C_{18}$ unsaturated carboxylic acid, optionally up to 40 weight percent of ethylene, optionally up to 40 weight percent of at least one ester of acrylic acid, and optionally up to 20 weight percent of other monomers copolymerizable therewith is polymerized in a first stage to produce a first stage polymer product. A second monomer composition comprising from 40 weight percent to 89.95 weight percent of at least one ester of methacrylic acid or a vinyl aromatic monomer, 10 weight percent to 59.95 weight percent of at least one ester of acrylic acid, and from 0.05 weight percent to 10 weight percent of at least one comonomer with acid functionality is then polymerized in a second stage and in the presence of said first stage product to produce a second stage polymer product. The relative amounts of the first and second monomer compositions are such that the weight ratio of the first stage polymer to the second stage polymer in the resultant copolymer dispersion is from 95:5 to 25:75, such as from 90:10 to 50:50, preferably from 85:15 to 60:40.

First Monomer Composition

The first monomer composition used in the present process comprises at least 50 weight percent, such as at least 55 weight percent, such as at least 60 weight percent, such as at least 65 weight percent, such as at least 70 weight percent, and up to 95 weight percent, such as up to 90 weight percent, such as up to 85 weight percent of vinyl acetate based on the total weight of monomers in the first monomer composition.

In addition to vinyl acetate, the first monomer composition comprises at least 5 weight percent, such as at least 10 weight percent, such as at least 15 weight percent, such as at least 20 weight percent, and up to 40 weight percent, such as up to 35 weight percent, such as up to 30 weight percent of at least one vinyl ester of a $C_5$ to $C_{18}$ unsaturated carboxylic acid. The $C_5$ to $C_{18}$ unsaturated carboxylic acid may be branched or unbranched, but preferred vinyl esters of $C_5$ to $C_{18}$ unsaturated carboxylic acids comprise vinyl esters of $C_7$ to $C_{15}$ branched chain unsaturated carboxylic acids, especially vinyl esters of $C_9$ to $C_{11}$ branched chain unsaturated carboxylic acids.

In addition to the above vinyl esters, the first monomer composition may optionally contain up to 40 weight percent of ethylene based on the total weight of monomers in the first monomer composition. Where ethylene is present in the first monomer composition, suitable ethylene concentrations include at least 5 weight percent, such as at least 10 weight percent, such as at least 15 weight percent, such as at least 20 weight percent, and up to 40 weight percent, such as up to 35 weight percent, such as up to 30 weight percent, based on the total weight of monomers in the first monomer composition.

Another optional monomer present in the first monomer composition is at least one ester of acrylic acid. Suitable acrylic acid esters are those with alcohols having 1 to 22, preferably up to 14 carbon atoms and mixtures thereof. Examples include methyl acrylate, ethyl acrylate, n-butyl acrylate, iso-butyl acrylate, tert-butyl acrylate, n-hexyl acrylate, n-octyl acrylate, 2-octyl acrylate, iso-octyl acrylate, 2-ethylhexyl acrylate, 2-propylheptyl acrylate, lauryl acrylate, tridecyl acrylate, tetradecyl acrylate, stearyl acrylate, and isobornyl acrylate. Preferred acrylic esters are ethyl acrylate, n-butyl acrylate, 2-octyl acrylate, 2-ethylhexyl acrylate, lauryl acrylate, and mixtures thereof. Particularly preferred are n-butyl acrylate and 2-ethylhexyl acrylate and mixtures thereof. Where present, the at least one ester of acrylic acid can comprise up to 40 weight percent, such as up to 30 weight percent, such as up to 25 weight percent, based on the total weight of monomers in the first monomer composition. Typical minimum values for the at least one ester of acrylic acid, where such is present in the first monomer composition, are at least 5 weight percent, such as at least 10 weight percent, again based on the total weight of monomers in the first monomer composition.

In addition to the main and optional monomers discussed above, the first monomer composition may optionally comprise up to 20 weight percent of one or more further monomers copolymerizable therewith, based on the total weight of monomers in the first monomer composition.

For example, the first monomer composition may further comprise up to 20% by weight of a vinyl halogenide, such as vinyl chloride, or up to 10% by weight, such as up to 5% by weight of an ester of methacrylic acid.

Further optional comonomers used in the first monomer composition are stabilizing monomers selected from the group consisting of ethylenically unsaturated sulfonic acids, ethylenically unsaturated phosphonic and phosphoric acids, ethylenically unsaturated carboxylic acids, ethylenically unsaturated carboxylic amides, ethylenically unsaturated carboxylic anhydrides and mixtures thereof. These comonomers can be present in an amount up to 3% by weight, preferably up to 1% by weight, of the total monomers in the first monomer composition.

By way of example, the stabilizing monomer may comprise an ethylenically unsaturated $C_3$-$C_8$ monocarboxylic acid and/or an ethylenically unsaturated $C_4$-$C_8$ dicarboxylic acid, together with the anhydrides or amides thereof. Examples of suitable ethylenically unsaturated $C_3$-$C_8$ monocarboxylic acids include acrylic acid, methacrylic acid and crotonic acid. Examples of suitable ethylenically unsaturated $C_4$-$C_8$ dicarboxylic acids include maleic acid, fumaric acid, itaconic acid and citraconic acid.

Examples of suitable ethylenically unsaturated sulfonic acids include those having 2-8 carbon atoms, such as vinylsulfonic acid, 2-acrylamido-2-methylpropanesulfonic acid, 2-acryloyloxyethanesulfonic acid and 2-methacryloyloxyethanesulfonic acid, 2-acryloyloxy- and 3-methacryloyloxypropanesulfonic acid. Preferred ethylenically unsaturated sulfonic acids are 2-acrylamido-2-methylpropanesulfonic acid and vinylsulfonic acid. Examples of suitable ethylenically unsaturated phosphonic or phosphoric acids include vinylphosphonic acid, esters of phosphonic or phosphoric acid with hydroxyalkyl(meth)acrylates and ethylenically unsaturated polyethoxyalkyletherphosphates.

In addition to or instead of the above acids, it is also possible to use the salts thereof, preferably the alkali metal or ammonium salts thereof, particularly preferably the sodium salts thereof, such as, for example, the sodium salts of vinylsulfonic acid and of 2-acrylamidopropanesulfonic acid.

If stabilizing monomers are used in the first monomer composition, their total relative amount, based on the total weight of monomers in the first monomer composition, is preferably lower than the total relative amount of acidic monomers in the second monomer composition, based on the total weight of monomers in the second monomer composition.

Another optional further monomer in the first monomer composition is an unsaturated silane, which can generally correspond to the structural Formula I:

Formula I in which R denotes an organic radical olefinically unsaturated in the ω-position and $R^1$, $R^2$, and $R^3$ which may be identical or different, denote the group —OZ, Z denoting hydrogen or primary or secondary alkyl or acyl radicals optionally substituted by alkoxy groups. Suitable unsaturated silane compounds of Formula I are preferably those in which the radical R in the formula represents an ω-unsaturated alkenyl of 2 to 10 carbon atoms, particularly of 2 to 4 carbon atoms, or an ω-unsaturated carboxylic acid ester formed from unsaturated carboxylic acids of up to 4 carbon atoms and alcohols of up to 6 carbon atoms carrying the Si group. Suitable radicals $R^1$, $R^2$, $R^3$ are preferably the group —OZ, Z representing primary and/or secondary alkyl radicals of up to 10 carbon atoms, preferably up to 4 carbon atoms, or alkyl radicals substituted by alkoxy groups, preferably of up to 3 carbon atoms, or acyl radicals of up to 6 carbon atoms, preferably of up to 3 carbon atoms, or hydrogen. Most preferred unsaturated silane co-monomers are vinyl trialkoxy silanes.

Examples of preferred silane compounds of the Formula I include γ-methacryloxypropyltris(2-methoxyethoxy)silane, vinyltrimethoxysilane, vinyltriethoxysilane, vinyldiethoxysilanol, vinylethoxysilanediol, allyltriethoxysilane, vinyltripropoxysilane, vinyltriisopropoxysilane, vinyltributoxysilane, vinyltriacetoxysilane, trimethylglycolvinylsilane, γ-methacryloxypropyltrimethylglycolsilane, γ-acryloxypropyltriethoxysilane and γ-methacryloxypropyltrimethoxysilane.

Where present, unsaturated silane monomers may comprise from 0.05 weight percent to about 3 weight percent of the total weight of monomers in the first monomer composition.

Further optional comonomers used in the first monomer composition are epoxy-functional, ethylenically unsaturated compounds, such as glycidyl methacrylate, glycidyl acrylate, allyl glycidyl ether, vinyl glycidyl ether and/or vinylepoxycyclohexane. These comonomers can be present in an amount up to 5% by weight, preferably up to 3% by weight, of the total monomers in the first monomer composition.

Further optional comonomers used in the first monomer composition are polyethylenically unsaturated and hence crosslinking comonomers, for example diallyl phthalate, diallyl maleate, triallyl cyanurate, tetraallyloxyethane, divinylbenzene, butanediol 1,4-dimethacrylate, triethylene glycol dimethacrylate, divinyl adipate, allyl (meth)acrylate, vinyl crotonate, methylenebisacrylamide, hexanediol diacrylate, pentaerythritol diacrylate and trimethylolpropane triacrylate, or mixtures of two or more compounds from this group. These comonomers can be present in an amount up to 5% by weight, preferably up to 2% by weight, of the total monomers in the first monomer composition.

Further optional comonomers used in the first monomer composition are hydroxy-functional esters of unsaturated carboxylic acids, such as hydroxyethyl(meth)acrylate, hydroxypropyl(meth)acrylate and adducts thereof with ethylene oxide or propylene oxide. These comonomers can be present in an amount up to 5% by weight, preferably up to 3% by weight, of the total monomers in the first monomer composition.

Further optional comonomers used in the first monomer composition are ethylenically unsaturated compounds containing crosslinkable groups, such as carbonyl groups or N-methylol groups. Examples thereof are diacetoneacrylamide, allyl acetoacetate, vinyl acetoacetate, acetoacetoxyethyl(meth)acrylate, N-ethanol(meth)acrylamide, N-propanol(meth)acrylamide, (meth)acrylamide, allyl carbamate, acrylonitrile, the N-methylol esters, N-methylol alkyl ethers or Mannich bases of N-methylol(meth)acrylamide or N-methylolallyl carbamate, acrylamidoglycolic acid and/or salts thereof, methyl acrylamidomethoxyacetate, N-(2,2-dimethoxy-1-hydroxyethyl) acrylamide, N-dimethylaminopropyl(meth)acrylamide, N-methyl(meth)acrylamide, N-butyl(meth)acrylamide, N-cyclohexyl(meth)acrylamide, N-dodecyl(meth)acrylamide, N-benzyl(meth)acrylamide, p-hydroxyphenyl(meth)acrylamide, N-(3-hydroxy-2,2-dimethylpropyl)methacrylamide, ethylimidazolidone methacrylate or N-vinylformamide, N-vinylyrrolidone. These comonomers can be present in an amount up to 5% by weight, preferably up to 3% by weight, of the total monomers in the first monomer composition.

As described below crosslinkable groups, such as carbonyl groups like acetoneacrylamide, allyl acetoacetate, vinyl acetoacetate, acetoacetoxyethyl(meth)acrylate are preferably used in combination with additives, such as dicarboxylic acid dihydrazides like adipidic acid dihydrazide or polyfunctional amines.

The relative proportions of the monomers in the first monomer composition are typically controlled such that the first stage polymer product has a glass transition temperature, $T_g$, less than 30° C., preferably from −15 to 25° C., more preferably from −5 to 15° C. All glass transition temperatures of the copolymers produced by the present process are calculated by the Fox Flory equation, $1/T_g = w_1/T_{g,1} + w_2/T_{g,2} + \ldots + w_n/T_{g,n}$, where $w_1, w_2, \ldots w_n$ are the weight fractions of monomers $1, 2, \ldots, n$, and $T_{g,1}, T_{g,2}, \ldots, T_{g,n}$ are the glass transition temperatures of their respective homopolymers (in Kelvin), as obtained by radical emulsion polymerization. The $T_g$ values of the majority of homopolymers are known and are listed, for example, in Polymer Handbook, $4^{th}$ edition, Brandrup, Immergut, Grulke (Eds.), Wiley, 1999.

Second Monomer Composition

The second monomer composition used in the present process comprises at least 40 weight percent, such as at least 45 weight percent, such as at least 50 weight percent and up to 89.95 weight percent, such as up to 80 weight percent, such as up to 70 weight percent, based on the total weight of monomers in the second monomer composition, of at least one ester of methacrylic acid or a vinyl aromatic monomer. Suitable esters of methacrylic acid for use in the second monomer composition comprise methyl methacrylate, ethyl methacrylate, butyl methacrylate, isobornyl methacrylate and mixtures thereof. A preferred ester of methacrylic acid is methyl methacrylate. Suitable vinyl aromatic monomers include styrene, vinyltoluene, vinylxylene, α-methylstyrene, o-chlorostyrene and mixtures thereof. In some embodiments, it may be desirable to limit or eliminate vinyl aromatic monomers in the second monomer composition, such that the latter contains less than 5 weight percent of any vinylaromatic monomer, based on the total weight of monomers in the second monomer composition, or even is free of any vinyl aromatic monomer.

In addition, the second monomer composition comprises at least 10 weight percent, such as at least 15 weight percent, such as at least 20 weight percent and up to 59.95 weight percent, such as up to 55 weight percent, such as up to 50 weight percent, based on the total weight of monomers in the second monomer composition, of at least one ester of acrylic acid. Suitable acrylic acid esters for use in the second monomer composition are those with alcohols having 1 to 22, preferably up to 14 carbon atoms and mixtures thereof. Examples include methyl acrylate, ethyl acrylate, n-butyl acrylate, iso-butyl acrylate, tert-butyl acrylate, n-hexyl acrylate, n-octyl acrylate, 2-octyl acrylate, iso-octyl acrylate, 2-ethylhexyl acrylate, 2-propylheptyl acrylate, lauryl acrylate, tridecyl acrylate, tetradecyl acrylate, stearyl acrylate, and isobornyl acrylate. Preferred acrylic esters are ethyl acrylate, n-butyl acrylate, 2-octyl acrylate, 2-ethylhexyl acrylate, lauryl acrylate, and mixtures thereof. Particularly preferred are n-butyl acrylate and 2-ethylhexyl acrylate and mixtures thereof.

The second monomer composition also comprises from 0.05 weight percent to 10 weight percent, such as from 0.1 weight percent to 10 weight percent, preferably from 0.5 weight percent to 8 weight percent, more preferably from 1 weight percent to 6 weight percent, based on the total weight of monomers in the second monomer composition, of at least one comonomer with acid functionality. Suitable comonomers with acid functionality comprise ethylenically unsaturated sulfonic acids, ethylenically unsaturated phosphonic and phosphoric acids, ethylenically unsaturated carboxylic acids, ethylenically unsaturated carboxylic anhydrides and mixtures thereof. Preferred comonomers with acid functionality comprise ethylenically unsaturated carboxylic acids, ethylenically unsaturated carboxylic anhydrides and mixtures thereof, with methacrylic acid, acrylic acid and mixtures thereof being especially preferred.

In some embodiments, the second monomer composition may further comprise at least one ethylenically unsaturated carboxylic amide, such as acrylamide, methacrylamide and mixtures thereof. Where present, suitable levels of ethylenically unsaturated carboxylic amide in the second monomer composition are from 0.05 weight percent to 5 weight percent, such as from 0.1 weight percent to 3 weight percent, based on the total weight of monomers in the second monomer composition.

In addition to the monomers described above, the second monomer composition can contain any of the optional monomers described as suitable for the first monomer composition (with the exception of vinyl halogenides) in the same amounts as the first monomer composition.

The relative proportions of the monomers in the second monomer composition are typically controlled such that the second stage polymer product has a glass transition temperature, $T_g$, from 5 to 90° C., such as from 15 to 80° C., preferably from 25 to 70° C., as calculated by the Fox Flory equation.

In most embodiments, the first stage polymer is arranged to have a lower glass transition temperature, $T_g$, than the second stage polymer, typically such that the $T_g$ of the first stage polymer is at least 5° C., preferably at least 10° C., lower than the second stage polymer.

The weight ratio of the first stage polymer to the second stage polymer is from 95:5 to 25:75, preferably from 90:10 to 50:50, more preferably from 85:15 to 60:40.

Dispersion Stabilization System

Both during and after polymerization, the multi-stage polymer described herein is stabilized in the form of an aqueous copolymer dispersion or latex. The copolymer dispersion is therefore prepared in the presence of and subsequently contains a stabilization system which generally comprises emulsifiers, in particular nonionic emulsifiers and/or anionic emulsifiers and/or protective colloids. Mixtures of the different stabilizers can also be employed.

The amount of emulsifier employed will generally be at least 0.5 wt. %, based on the total quantity of monomers in the copolymer dispersion. Generally, emulsifiers can be used in amounts up to about 8 wt. %, based on the total quantity of monomers in the copolymer dispersion. Emulsifiers employed with preference herein are nonionic emulsifiers having alkylene oxide groups and/or anionic emulsifiers having sulfate, sulfonate, phosphate and/or phosphonate groups. Such emulsifiers, if desired, can be used together with molecularly or dispersely water-soluble polymers. Preferably also the emulsifiers used contain no alkylphenolethoxylate (APEO) structural units.

Examples of suitable nonionic emulsifiers include acyl, alkyl, oleyl, and alkylaryl ethoxylates. These products are commercially available, for example, under the name Genapol®, Lutensol® or Emulan®. They include, for example, ethoxylated mono-, di-, and tri-alkylphenols (EO degree: 3 to 50, alkyl substituent radical: $C_4$ to $C_{12}$) and also ethoxylated fatty alcohols (EO degree: 3 to 80; alkyl radical: $C_8$ to $C_{36}$), especially $C_{10}$-$C_{14}$ fatty alcohol (3-40) ethoxylates, $C_{11}$-$C_{15}$ oxo-process alcohol (3-40) ethoxylates, $C_{16}$-$C_{18}$ fatty alcohol (11-80) ethoxylates, $C_{11}$ oxo-process alcohol (3-40) ethoxylates, $C_{13}$ oxo-process alcohol (3-40) ethoxylates, polyoxyethylenesorbitan monooleate with 20 ethylene oxide groups, copolymers of ethylene oxide and propylene oxide having a minimum ethylene oxide content of 10% by weight, the polyethylene oxide (4-40) ethers of oleyl alcohol, and the polyethene oxide (4-40) ethers of nonylphenol. Particularly suitable are the polyethylene oxide (4-40) ethers of fatty alcohols, more particularly of oleyl alcohol, stearyl alcohol or $C_{11}$ alkyl alcohols.

The amount of nonionic emulsifiers used in preparing the copolymer dispersions herein is typically up to about 8% by weight, preferably up to about 5% by weight, more preferably up to about 3% by weight, based on the total monomer quantity. Mixtures of nonionic emulsifiers can also be employed.

Examples of suitable anionic emulsifiers include sodium, potassium, and ammonium salts of linear aliphatic carboxylic acids of chain length $C_{12}$-$C_{20}$, sodium hydroxyoctadecanesulfonate, sodium, potassium, and ammonium salts of hydroxy fatty acids of chain length $C_{12}$-$C_{20}$ and their sulfonation and/or sulfation and/or acetylation products, alkyl sulfates, including those in the form of triethanolamine salts, alkyl($C_{10}$-$C_{20}$) sulfonates, alkyl($C_{10}$-$C_{20}$) arylsulfonates, and their sulfonation products, lignosulfonic acid and its calcium, magnesium, sodium, and ammonium salts, resin acids, hydrogenated and dehydrogenated resin acids, and their alkali metal salts, dodecylated sodium diphenyl ether disulfonate, sodium alkyl sulfate, sulfated alkyl or aryl ethoxylate with EO degree between 1 and 30, for example ethoxylated sodium lauryl ether sulfate or a salt of a bisester, preferably of a bis-$C_4$-$C_{18}$ alkyl ester, of a sulfonated dicarboxylic acid having 4 to 8 carbon atoms, or a mixture of these salts, preferably sulfonated salts of esters of succinic acid, more preferably salts, such as alkali metal salts, of bis-$C_4$-$C_{18}$ alkyl esters of sulfonated succinic acid, or phosphates of polyethoxylated alkanols. Particularly suitable are sodium or potassium alkyl sulfates such as sodium lauryl sulfate, and sodium, potassium or ammonium salts of sulfated $C_{10}$-$C_{16}$ alkyl ethoxylates with an EO degree between 1 and 30.

The amount of anionic emulsifiers used can typically range from about 0.1% to about 3.0% by weight, preferably from about 0.1% to about 2.0% by weight, more preferably from about 0.5% to about 1.5% by weight, based on the total monomer quantity. Mixtures of anionic emulsifiers can also be employed.

Also suitable as stabilizers for the present dispersions are copolymerizable nonionic and anionic surfactants such as those disclosed in US 2014/0243552. Other suitable copolymerizable surfactants are sold under the trade names Hitenol® BC, Hitenol® KH, Hitenol® AR, Adeka Reasoap SR, and Adeka Reasoap ER.

Along with emulsifiers, the aqueous copolymer dispersions employed in accordance with the present development may also comprise as part of the stabilizer system a selected type of protective colloid based on cellulose ethers, poly vinyl alcohol, poly vinyl pyrrolidone, polyacrylic acid, maleic acid styrene copolymers or other water soluble polymers. Suitable protective colloids used in the copolymer dispersions herein include water-soluble or water-dispersible polymeric modified natural substances based on cellulose ethers. Such cellulose ethers have a viscosity, when tested as a 1 wt. % aqueous in water at 25° C., of 5 to 5,000 mPas, preferably of 10 to about 1,500 mPas, more preferably 10 to 500 mPas. Mixtures of celluloses ethers may be used to achieve these viscosity values. Examples of suitable cellulose ether materials include methyl cellulose, hydroxyethyl cellulose, hydroxypropyl cellulose, hydroxypropyl methyl cellulose, ethyl hydroxyethyl cellulose, methyl hydroxyethyl cellulose and combinations of these cellulose ethers.

Another suitable protective colloid is poly vinyl alcohol. Suitable poly vinyl alcohols have a degree of hydrolysis of 60 to 100 mol % and a viscosity of the 4% aqueous solution at 20° C. of 2 to 70 mPa s, such as from 30 to 70 mPa s.

The protective colloids can be used individually or in combination. In the case of combinations, the two or more colloids can each differ in their molecular weights or they can differ in their molecular weights and in their chemical composition, such as the degree of hydrolysis, for example.

When protective colloids are used, the amount thereof, based on the total amount of monomers used, is typically from 0.1 to 5 parts by weight, preferably from 0.3 to 3 parts by weight.

If the weight ratio of the first stage polymer to the second stage polymer is less than 80:20, the present dispersions preferably do not comprise any protective colloid at all, or the amount of protective colloid, based on the total amount of monomers used, is less than 1% by weight, more preferably less than 0.5% by weight.

In addition to the emulsifiers and protective colloids that are used during the emulsion polymerization of the copolymers herein, it is also possible to add further emulsifiers, protective colloids and/or other stabilizers after the polymerization.

Preparation of the Polymer Dispersion

The desired copolymer dispersion is produced by multi-stage emulsion polymerization of the monomers and stabilizing system described above in an aqueous medium and in the presence of one or more free radical initiators. Suitable free radical initiators include hydrogen peroxide, benzoyl peroxide, cyclohexanone peroxide, isopropyl cumyl hydroperoxide, persulfates of potassium, of sodium and of ammonium, peroxides of saturated monobasic aliphatic carboxylic acids having an even number of carbon atoms and a $C_8$-$C_{12}$ chain length, tert-butyl hydroperoxide, di-tert-butyl peroxide, diisopropyl percarbonate, azoisobutyronitrile, acetylcyclohexanesulfonyl peroxide, tert-butyl perbenzoate, tert-butyl peroctanoate, bis(3,5,5-trimethyl)hexanoyl peroxide, tert-butyl perpivalate, hydroperoxypinane, p-methane hydroperoxide. The abovementioned compounds can also be used within redox systems, using transition metal salts, such as iron(II) salts, or other reducing agents. Alkali metal salts of oxymethanesulfinic acid, hydroxylamine salts, sodium dialkyldithiocarbamate, sodium bisulfite, ammonium bisulfite, sodium dithionite, diisopropyl xanthogen disulfide, ascorbic acid, tartaric acid, and isoascorbic acid can also be used as reducing agents.

The multi-stage emulsion polymerization may be carried out in accordance with the customary techniques of emulsion polymerization. Preferably, the process is carried out by polymerizing in a first stage the first monomer composition in an aqueous phase in the presence of emulsifiers, initiators and, if desired, protective colloids, at suitable temperatures of, for example from 20 to 120° C., preferably 40 to 110° C., and most preferably 50 to 95° C. to produce a first polymer phase. The reaction temperature may also be ramped up during of the polymerization as described in U.S. patent application 2017/029544. After the complete or virtually complete conversion of at least 85%, such as at least 90%, preferably at least 95% of the first stage monomers, the second monomer composition is polymerized in a second stage in the aqueous phase in the presence of the first polymer phase as well as emulsifiers, initiators and, if desired, protective colloids, at suitable temperatures of, for example, from 20 to 120° C., preferably 40 to 110° C., more preferably from 50 to 95° C., to produce the second polymer phase and thereby to obtain polymer particles comprising the first and second polymer phase. The emulsion polymerization of the second stage can be performed with or without a pre-emulsion, preferably without a pre-emulsion. In some embodiments, it may be desirable to pre-polymerize a small amount (less than 10 weight %) of the first monomer composition to produce an in-situ seed before the remaining amounts of the first and second monomer compositions are sequentially metered into the reactor to form the final polymer dispersion.

The molecular weight of the various copolymers in the copolymer dispersions herein can be adjusted by adding small amounts of one or more molecular weight regulator substances, also known as chain transfer agents (CTA). These CTAs are generally used in an amount of up to 2% by weight, based on the total weight of the monomers in monomer mixtures I and II. It is possible to use all of the CTAs known to the skilled artisan. Preference is given to organic thio compounds such as methylthiol, ethylthiol, n-propylthiol n-butylthiol, n-hexylthiol, n-octylthiol, n-decyhhiol, n-dodecylthiol, n-tetradecyhhiol, hexadecylthiol n-octadecylthiol, cycloltex ylthiol, isopropyl thiol, tert-butylthiol, tert-nonylthiol, tert-dodecylthiol, 4-methylbenzene thiol, 2-mercaptopropionic acid, isooctyl 3-mercaptopropionate, 4,4'-thiobisbenzenethiol, pentaerythritol tetralds(2-mercaptoacetatel and pentaerythritol tetrakis (3-mercaptopropionate).

On completion of the polymerization, a further, preferably chemical after-treatment, especially with redox catalysts, for example combinations of the above-mentioned oxidizing agents and reducing agents, may follow to reduce the level of residual unreacted monomer on the product. In addition, residual monomer can be removed in known manner, for example by physical demonomerization, i.e. distillative removal, especially by means of steam distillation, or by stripping with an inert gas. A particularly efficient combination is one of physical and chemical methods, which permits lowering of the residual monomers to very low contents (<1000 ppm, preferably <100 ppm).

The polymerized particles produced by the present process typically have a weight-averaged diameter of less than 200 nm, preferably less than 150 nm, as measured by a combination of laser diffraction and polarization intensity differential scattering (PIDS) using a Beckman Coulter LS 13320 Particle Size Analyzer.

In addition to monomers described herein, the final polymers may also contain a water-soluble cross-linking agent. Such a cross-linking agent will react with specific polymer functionalities such as carbonyl or 1,3-dicarbonyl groups as water is removed from the coating compositions herein and as a film or coating is formed from the polymerized components.

A type of water-soluble cross-linking agent that can be used in the compositions herein comprises a compound which contains at least two hydrazine and/or hydrazide moieties. Particularly suitable are dihydrazine compounds of aliphatic dicarboxylic acids of 2 to 10, in particular 4 to 6, carbon atoms, e.g., oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide and/or itaconic acid dihydrazide. Water-soluble aliphatic dihydrazines of 2 to 4 carbon atoms, e.g., ethylene-1,2-dihydrazine, propylene-1,3-dihydrazine or butylene-1,4-dihydrazine, are also suitable. Adipic acid dihydrazide (ADH) is a preferred water-soluble cross-linking agent for use in the compositions herein, especially those produced from monomer compositions containing diacetone acrylamide (DAAM).

Other suitable water-soluble cross-linking agents are compounds which contain at least two amine functional moieties such as ethylene diamine and hexamethylene diamine Such cross-linking agents are preferred in combination with polymers comprising 1,3-dicarbonyl groups, such as acetoacetoxyethyl methacrylate (AAEM).

Generally, such water-soluble cross-linking agents are post added to the dispersion such that the molar ratio of cross-linking agent functional groups to polymer functional groups is between about 0.1 and about 2.0. More preferably the molar ratio of cross-linking agent functional groups to copolymer functional groups in the blend will be between about 0.5 and 2.0.

The aqueous polymer dispersions produced by the process of the invention generally have a solids content of from 30 to 70% by weight, preferably from 40 to 60% by weight, more preferably from 50 to 55% by weight, and a pH between 2.5 and 8, preferably between 3.0 and 7, more preferably between 4.5 and 6.

Coating Compositions

The aqueous multistage vinyl ester/acrylic dispersions described herein are stable fluid systems which can be used to produce coating compositions suitable for coating a multitude of substrates. Suitable substrates are, for example, wood, concrete, metal, glass, ceramics, plastic, plasters, wallpaper, other paper, or painted, primed or weathered substrates. The coating composition is applied to the substrate to be coated in a manner dependent on the configuration of the coating composition. The application can, depending on the viscosity and the pigment content of the formulation and on the substrate, be effected by means of rolling, brushing, knife coating, dipping or as a spray.

Preferred uses of such coating compositions are in plasters and renders, and in façade paints, wood protection paints and interior paints, particularly solvent- and plasticizer-free paints. When used in such applications, the aqueous multistage dispersions produced by the present process is typically combined with one or more conventional fillers and/or pigments. In this context, pigments are understood as meaning solids which have a refractive index greater than or equal to 1.75, whereas fillers are understood as meaning solids which have a refractive index of less than 1.75.

Examples of mineral fillers are alkaline earth metal oxides, alkaline earth metal carbonates and/or silicate fillers, in particular calcium carbonate, mica, feldspar, kaolin, quartz powders and/or particulate quartz fractions and marble powders and/or particulate marble fractions. When used in plasters and renders, the filler generally has a particle size of at least 40 µm, whereas when used in a paint, the filler typically has a size of 1 to 40 µm.

Pigments may be any inorganic or organic and may be color-imparting or opaque finely divided solids. Preferred pigments have a mean diameter for the primary particle of less than or equal to 1 µm, preferably from 0.1 to 0.5 µm, determined by sedimentation analysis according to DIN 66115. Examples of inorganic pigments are metal oxides, such as titanium dioxide, iron oxide or zinc oxide, in particular titanium dioxide. Examples of organic pigments are phthalocyanines, in particular phthalocyanine blue, or diaryl pigments, azo pigments or quinacridone pigments.

To disperse the fillers and pigments in water, auxiliaries based on anionic or non-ionic wetting agents, such as preferably, for example, sodium pyrophosphate, sodium polyphosphate, naphthalenesulfonate, sodium polyacrylate, sodium polymaleinates and polyphosphonates such as sodium 1-hydroxyethane-1,1-diphosphonate and sodium nitrilotris(methylenephosphonate), may be added.

Thickeners may also be added to the coating compositions described herein. Thickeners which may be used include, inter alia, cellulose derivates such as methylcellulose (MC), hydroxyethylcellulose (HEC) and carboxymethylcellulose. Other thickeners which may be used include casein, gum arabic, gum tragacanth, starch, sodium alginate, polyvinyl alcohol, polyvinylpyrrolidone, sodium polyacrylate and water-soluble copolymers based on acrylic and methacrylic acid, such as acrylic acid/acrylamide and methacrylic acid/acrylic ester copolymers. Hydrophobically-modified alkali soluble (acrylic) emulsions (HASE), hydrophobically-modified ethoxylate (poly)urethanes (HEUR), and polyether polyols (PEPO) are also available. Inorganic thickeners, such as, for example, bentonites or hectorite, may also be used.

The coating compositions may also comprise crosslinking additives. Such additives may be: aromatic ketones, for example alkyl phenyl ketones, which may have one or more substituents on the phenyl ring, or benzophenone and substituted benzophenones as photoinitiators. Photoinitiators suitable for this purpose are disclosed, for example, in DE-A-38 27 975 and EP-A-0 417 568. It addition, it is possible to use, in the coating compositions, as further additives, waxes based on paraffins and polyethylene, and matting agents, defoamers, pH modifiers, preservatives or hydrophobicizing agents, UV stabilizers, fibers, plasticizers and further additives known to those skilled in the art. Examples of coalescent agents are white spirit, Texanol®, TxiB®, butyl glycol, butyl diglycol, butyl dipropylene glycol, and butyl tripropylene glycol. Examples of plasticizers are dimethyl phthalate, diisobutyl phthalate, diisobutyl adipate, Coasol B® and Plastilit 3060®. Examples of defoamers are mineral oil defoamers or silicone defoamers. Examples of UV stabilizers are sterically hindered piperidine compounds (HALS) or benzophenone derivatives.

Properties of Coating Compositions

The minimum temperature required for the polymer dispersion or coating composition to form a film is referred to as the minimum film forming temperature or MFFT (DIN ISO 2115). The polymer dispersion herein may have a MFFT of less than 20° C., preferably less than 10° C., more preferably equal or less than 6° C., to allow the formulation of paint compositions with less than 2.5 weight percent, preferably less than 1 weight percent of any organic solvent, plasticizer or coalescent agent. Most preferably, the paint compositions are free of any organic solvent, plasticizer or coalescent agent. The resulting coatings exhibit enhanced resistance to whitening, reduced water take up, and reduced water permeability. In particular, coatings produced from the polymer dispersions described herein exhibit a liquid water transmission rate $w_{24}$ of less than 0.1 kg m$^{-2}$ h$^{-0.5}$ (after 3 conditionings of the specimens) and a liquid water transmission rate $w_{24}$ of less than 0.2 kg m$^{-2}$ h$^{-0.5}$ during the initial immersion in water when tested in accordance with DIN EN 1062-3, as described in the Examples.

The aqueous multistage polyvinyl ester dispersions described herein can also be used as binders for plaster compositions of all kinds, such as synthetic resin-bound plasters, paste-form tile adhesives, paste-form sealants and paste-form sealing compositions, as well as plaster-coated thermal insulation systems. Thermal insulation systems utilizing the present coating compositions have excellent flame retardant properties.

The invention will now be more particularly described with reference to the following non-limiting Examples.

COMPARATIVE EXAMPLE 1

A 3 liter reactor equipped with a reflux condenser and an anchor stirrer was filled with 759 g of deionized (DI) water, 3 g of anhydrous sodium acetate, 80 g of a 15% active aqueous solution of sodium lauryl sulfate, and 51.4 g of a 70% active aqueous solution of an undecyl ethoxylate with approx. 28 EO units. After the reactor content was heated to 65° C., 24 g of a 25% active aqueous solution of sodium vinyl sulfonate, and 5% of monomer feed 1, as described in Table 1, were added within 10 min (initial charge). A solution of 0.6 g sodium persulfate in 18 g of water was added and the reactor temperature was increased to 70° C. 10 min after the addition of the sodium persulfate solution (seed polymerization), the remaining amount of monomer feed 1 was added to the reactor with a constant dosage rate over 140 min (stage 1). Simultaneously, a solution of 1.2 g sodium persulfate in 60 g water was added with a constant dosage rate over 240 min. The reactor temperature was maintained at 70° C. during the addition of monomer feed 1. 10 min after the completion of monomer feed 1, the reactor temperature was increased to 80° C. 20 min after the completion of monomer feed 1, monomer feed 2 was added to the reactor with a constant dosage rate over 80 min (stage 2). Monomer feed 2 was obtained by mixing the ingredients in Table 1 under stirring. The reactor temperature was maintained at 80° C. during the addition of monomer feed 2. After completion of the feed additions, the reactor temperature was increased to 85° C. and a solution of 1.2 g sodium persulfate in 18 g water was added to the reactor. The reactor content was held at 85° C. for 60 minutes and then cooled to 50° C. At 50° C., 0.9 g of tert-butyl hydroperoxide (TBHP, 70%) in 12 g water were added to the reactor. Subsequently, 0.6 g of sodium metabisulfite in 20 g water were added within 30 min. The reactor content was then cooled to room temperature.

The properties of the resulting polymer dispersion are summarized in Table 3.

EXAMPLE 1 (INVENTIVE

The process of Comparative Example 1 was repeated with varying monomer feed composition 2, as described in Table 1. The polymer dispersion was adjusted with an aqueous 12.5% ammonium hydroxide solution to pH=7.

The properties of the resulting polymer dispersion are summarized in Table 3.

COMPARATIVE EXAMPLE 2

The process of Comparative Example 1 was repeated with varying monomer feed compositions, as described in Table 1, and with the following modifications: The reactor was filled with 696 g instead of 759 g DI water. After completion of the seed polymerization, the remaining amount of monomer feed 1 was added to the reactor with a constant dosage rate over 104 min. 20 min after completion of monomer feed 1, monomer feed 2 was added to the reactor with a constant dosage rate over 116 min.

The properties of the resulting polymer dispersion are summarized in Table 3.

EXAMPLE 2 (INVENTIVE

The process of Comparative Example 2 was repeated with varying monomer feed composition 2, as described in Table 1. The pH of the polymer dispersion was adjusted with an aqueous 12.5% ammonium hydroxide solution to pH=7.

The properties of the resulting polymer dispersion are summarized in Table 3.

COMPARATIVE EXAMPLE 3

An aqueous solution consisting of the following ingredients was introduced into a 60 liter pressure reactor equipped with a stirrer, jacket heating and metering pumps: 22340 g of DI water, 1430 g of a 70% active aqueous solution of undecyl ethoxylate with 28 ethylene oxide units, 2222 g of a 15% active aqueous solution of sodium lauryl sulfate, 667 g of a 25% active aqueous solution of sodium vinyl sulfonate and 7.7 g of a 1% active solution of ferrous sulfate heptahydrate. The reactor content was adjusted to pH 4.5 with acetic acid. The atmosphere inside the reactor was flooded with nitrogen. 6270 g of vinyl acetate and 2000 g of ethylene (cf. Table 2) were charged to the reactor and the reaction mix was heated to 70° C. A reducer solution comprising 2000 g of DI water, 18 g of sodium bicarbonate and 100 g of Bruggolite®FF6M (Brüggemann Chemical) was prepared. 10% of this reducer solution was added to the reactor. The remaining 90% of the reducer solution were then added at a constant rate of 847 g/h. Simultaneously, an oxidizer solution comprising 2000 g DI water and 110 g of a 70% active aqueous solution of tert-butyl hydroperoxide were added at a constant rate of 1010 g/h. After initiation was observed through a temperature increase, the reactor temperature set-point was raised to 85° C. and 16241 g of vinyl acetate, 3400 g of vinyl neodecanoate, and 200 g of vinyltriethoxysilane were added with a constant dosage rate over 75 min and the reactor was pressurized with 434 g of ethylene (stage 1, cf. Table 2). During these additions, the reactor temperature was kept constant at 85° C. through jacket cooling. After completion of the monomer additions of feed 1, 3500 g methyl methacrylate and 1500 g of 2-ethylhexyl acrylate were added over 50 min (stage 2, cf. Table 2). With the start of the acrylic monomer additions, the dosage rates for both oxidizer and reducer solutions were reduced to 135 g/h. After completion of the monomer addition of stage 2, the residual amounts of oxidizer and reducer solutions were added within 35 min. The reactor was then cooled to 60° C. and 23 g Bruggolite®FF6M in 400 g deionized water were added to the reactor within 15 min. Subsequently, 48 g tert-butyl hydroperoxide (70%) in 400 g deionized water were added to the reactor within 15 min. After another 15 min, the reactor content was cooled to room temperature. Finally, 1300 g of Mowiplus SA 300 (Celanese), a 25% active aqueous solution of a styrene-maleic anhydride copolymer, was added to the resulting dispersion.

The properties of the resulting polymer dispersion are summarized in Table 3.

EXAMPLE 3 (INVENTIVE

The process of Comparative Example 3 was repeated with varying monomer feed composition 2, as described in Table 2.

The properties of the resulting polymer dispersion are summarized in Table 3.

COMPARATIVE EXAMPLE 4

The process of Comparative Example 3 was repeated with varying monomer feed compositions and ethylene charges, as described in Table 2.

The properties of the resulting polymer dispersion are summarized in Table 3.

EXAMPLE 4 (INVENTIVE

The process of Comparative Example 3 was repeated with varying monomer feed composition 2, as described in Table 2.

The properties of the resulting polymer dispersion are summarized in Table 3.

COMPARATIVE EXAMPLE 5

The process of Comparative Example 3 was repeated with varying monomer feed compositions and ethylene charges, as described in Table 2.

The properties of the resulting polymer dispersion are summarized in Table 3.

COMPARATIVE EXAMPLE 6

The process of Comparative Example 3 was repeated with varying monomer feed compositions and ethylene charges, as described in Table 2.

The properties of the resulting polymer dispersion are summarized in Table 3.

TABLE 1

Monomer feed composition of Examples and Comparative Examples 1-2 (in grams)

| | Example | | | |
|---|---|---|---|---|
| | C1 | 1 | C2 | 2 |
| Monomer feed 1 (stage 1) | | | | |
| Vinyl acetate | 624 | 624 | 480 | 480 |
| Vinyl neodecanoate | 156 | 156 | 120 | 120 |
| Monomer feed 2 (stage 2) | | | | |
| DI water | 147 | 147 | 210 | 210 |
| Sodium lauryl sulfate, 15% in water | 14 | 14 | 20 | 20 |
| Methacrylic acid | 0 | 12 | 0 | 12 |
| Acrylic acid | 0 | 0 | 0 | 6 |
| Methyl methacrylate | 240 | 240 | 342 | 342 |
| 2-Ethylhexyl acrylate | 180 | 180 | 258 | 258 |

TABLE 2

Monomer feed composition of Examples 3-4 and Comparative Examples 3-6 (in grams)

| | Example | | | | | |
|---|---|---|---|---|---|---|
| | C3 | 3 | C4 | 4 | C5 | C6 |
| Monomer feed 1 | | | | | | |
| Vinyl acetate | 16241 | 16241 | 14875 | 14875 | 18100 | 18100 |
| Vinyl neodecanoate | 3400 | 3400 | 5800 | 5800 | 0 | 0 |
| Vinyltriethoxysilane | 200 | 200 | 200 | 200 | 200 | 200 |
| Ethylene | | | | | | |
| Pre-charge | 2000 | 2000 | 2068 | 2068 | 2000 | 2000 |
| Charge (stage 1) | 434 | 434 | 0 | 0 | 1415 | 1415 |
| Monomer feed 2 | | | | | | |
| Methacrylic acid | 0 | 300 | 0 | 0 | 0 | 0 |
| Acrylic acid | 0 | 0 | 0 | 217 | 0 | 278 |
| Methyl methacrylate | 3500 | 3500 | 3035 | 3035 | 3885 | 3885 |
| 2-Ethylhexyl acrylate | 1500 | 1500 | 1300 | 1300 | 1667 | 1667 |

TABLE 3

Properties of the polymer dispersions

| | Example | | | | | | | | | |
|---|---|---|---|---|---|---|---|---|---|---|
| | C1 | 1 | C2 | 2 | C3 | 3 | C4 | 4 | C5 | C6 |
| Solid content (%)[1] | 51.7 | 51.6 | 52.3 | 52.2 | 52.9 | 52.9 | 53.0 | 52.7 | 52.5 | 52.6 |
| Brookfield viscosity (mPa s)[2] | 2670 | 1645 | 1930 | 2320 | 590 | 620 | 630 | 1090 | 460 | 690 |
| pH | 4.5 | 7.0 | 4.6 | 7.1 | 7.8 | 7.0 | 7.6 | 6.2 | 7.6 | 6.3 |
| $d_w$ (nm)[3] | 120 | 120 | 130 | 130 | 130 | 130 | 140 | 140 | 150 | 140 |
| MFFT (° C.)[4] | 13 | 15 | 13 | 16 | 4 | 6 | 2 | 6 | 1 | 1 |
| 1st water uptake (%)[5] | 6.5 | 3.3 | 7.6 | 5.0 | 30 | 17 | 21 | 18 | 39 | 18 |
| 2nd water uptake (%)[5] | 3.3 | 3.0 | 5.0 | 3.1 | 17 | 15 | 14 | 10 | 20 | 11 |
| Transmission (%) after 30 min[6] | 71 | 82 | 87 | 97 | 90 | 94 | 90 | 93 | 82 | 81 |
| Transmission (%) after 120 min[6] | 42 | 63 | 54 | 90 | 63 | 83 | 51 | 78 | 37 | 11 |

TABLE 3-continued

Properties of the polymer dispersions

| | Example | | | | | | | | | |
|---|---|---|---|---|---|---|---|---|---|---|
| | C1 | 1 | C2 | 2 | C3 | 3 | C4 | 4 | C5 | C6 |
| Transmission (%) after 360 min[6] | 13 | 27 | 21 | 72 | 25 | 68 | 18 | 33 | 9 | 5 |

[1]Gravimetric determination after 24 h drying at 110° C.
[2]Measurement conditions: 20° C. 20 rpm, spindle 2 (below 1500 mPa s) or spindle 3 (above 1500 mPa s)
[3]Weight-average particle diameter as determined by a Beckman Coulter LS 13320 Particle Size Analyzer
[4]The minimum film forming temperature (MFFT) is defined as the lowest temperature at which a polymer dispersion coalesces when laid on a substrate as a thin film, thereby forming clear transparent film.
[5]The first and second water uptakes of the polymer films are determined as described in detail below.
[6]The degree of whitening of the polymer films is determined through transmission measurements as described in detail below.

Dried films of polymer dispersions take up water when immersed in the latter. The magnitude of the gravimetric water uptake can be used to assess the hydrophilicity of dispersion films. For façade paints and plasters, hydrophobic dispersion films are preferably used as polymeric binders, exhibiting a low water uptake. To assess the magnitude of the water uptake of the inventive and comparative dispersion films, 30 g of the aqueous dispersion were cast into a Teflon® disc with a diameter of approx. 170 mm. If needed, 30 g of aqueous dispersion were diluted with 10 g of water prior to casting to facilitate leveling of the film. The films were then dried at 50° C. in a cabinet dryer for 7 days. The Teflon® discs were stored horizontally to achieve a uniform dry film thickness of approx. 500 μm. The dispersion films were turned every two days to produce thoroughly dried films. Only films without cracks and air bubbles were used for testing. After drying, a 5×5 cm square was cut out of the polymer film and weighed ($m_{dry,1}$). It was then put in a petri dish and immersed in water for 24 h. After removing excess water, the weight of the film after water uptake was measured ($m_{wet,1}$). The first water uptake (%) is calculated by $100 \times (m_{wet,1} - m_{dry,1})/m_{dry,1}$. To determine the second water uptake, the same polymer film was dried for another two days to determine $m_{dry,2}$, then immersed in water for another 24 h to determine $m_{wet,2}$. The second water uptake is calculated according to the first water uptake. While the magnitude of the first water uptake can be used to assess the hydrophilicity of a new polymer film, the magnitude of the second water uptake quantifies the hydrophilicity of an aged polymer film.

The first and second water uptake of inventive and comparative dispersion films are shown in Table 3. As can be inferred from the reported data, both first and second water uptake of the inventive dispersions comprising acidic co-monomers in the second stage are significantly lower than those values of the corresponding acid-free comparative dispersions.

Initially transparent dried films of polymer dispersions are also prone to whitening when immersed in water. Water whitening is an optical phenomenon which is caused by the hydration of hydrophilic parts of the polymer film. Hydration changes the refractive index of these parts and leads to light scattering at the interfaces of hydrated and non-hydrated domains. The water whitening of polymer films was quantitatively assessed by time-dependent photometric transmission measurements. Dispersion films were cast onto a glass plate with a scraper to yield a wet film thickness of approx. 200 μm. The films were dried for 1 hour at 50° C. and for 24 hours at room temperature. The transmission of light (wavelength: 450 nm) through the polymer film was measured with Spectrophotometer DR/4000U (Hach). The film-coated glass plates were immersed in 23° C. warm DI water. After defined times, the glass plates were put in a water-filled cuvette and the light transmission through the cuvette was measured. The transmission through a water-filled cuvette equipped with a pristine glass plate was defined and calibrated as 100%.

The transmissions through inventive and comparative dispersion films at various immersion times are shown in Table 3. As can be inferred from the reported data, the films cast from the inventive dispersions turn less turbid than the films from the corresponding comparative examples. Hence, the presence of at least one hydrophilic acid co-monomer in the second phase imparts the polymer dispersion with a resistance against water whitening if a long chain vinyl ester, like vinyl neodecanoate, is included in the first stage of the polymerization process. On the other hand, a dispersion comprising acid-functional monomers in the second stage is even more prone to water whitening than an acid-free equivalent, if no long chain vinyl ester is co-polymerized in the first stage (compare C5 and C6).

EXAMPLES 7-8 (INVENTIVE AND COMPARATIVE FAÇADE PAINTS)

Façade paints were prepared by mixing the ingredients in Table 4 at room temperature under stirring. After dissolving and dispersing item nos. 2-5 in water, pigment and fillers as per item nos. 6-9 were dispersed consecutively by increasing the dissolver speed to 5000 rpm. After the preparation of the mill base, item nos. 10-13 were added while gently stirring. The solid contents of all polymer dispersions were adjusted to 50% before their addition. The resulting paints had a solid content of approx. 65% and a pigment volume concentration (PVC) of approx. 50%.

TABLE 4

Composition of the façade paints

| Pos. | | Supplier | Description | Parts per weight |
|---|---|---|---|---|
| 1 | Water | | | 156 |
| 2 | Tylose ® MH 4000 KG4 | SE Tylose | Thickener | 2 |
| 3 | Calgon ® N, 10% | ICL | Dispersing agent | 15 |
| 4 | Mowiplus ® XW 330 | Celanese | Dispersing agent | 3 |
| 5 | Agitan ® 232 | Münzing | Defoamer | 4 |
| 6 | Kronos ® 2160 | Kronos | Titanium dioxide | 225 |
| 7 | Finntalc M 15 | Mondo Minerals | Talc | 40 |
| 8 | Polwhite ® B | Imerys | Kaolin | 20 |
| 9 | Omyacarb ® 5 GU | Omya | Calcium carbonate | 195 |

TABLE 4-continued

Composition of the façade paints

| Pos. | Supplier | Description | Parts per weight |
|---|---|---|---|
| 10 | Ammonium hydroxide, 25% | | Base | 2 |
| 11 | Dispersion per Ex. 1-2 or C1-C2 | | | 320 |
| 12 | Butyldiglycol acetate | | Coalescent agent | 8 |
| 13 | Dowanol™ DPnB | Dow | Coalescent agent; dipropylene glycol n-butyl ether | 10 |

EXAMPLES 9-12 (INVENTIVE AND COMPARATIVE PLASTERS

Plasters were prepared by mixing the ingredients in Table 5 at room temperature under stirring. After dissolving and dispersing item nos. 2-5 in water, and consecutive additions of item nos. 6-9, pigment and fine fillers as per item nos. 10-12 were dispersed consecutively at a dissolver speed of about 2000 rpm. The coarse fillers as per item nos. 13-16 were then added at a dissolver speed of about 500 rpm. The solid contents of all polymer dispersions were adjusted to 50% before their addition. The resulting plasters had a solid content of approx. 84%.

TABLE 5

Composition of the plasters

| Pos. | | Supplier | Description | Parts per weight |
|---|---|---|---|---|
| 1 | Water | | | 73 |
| 2 | Tylose ® MH 6000 YG8 | SE Tylose | Thickener | 0.7 |
| 3 | Calgon ® N, 10% | ICL | Dispersing agent | 7 |
| 4 | Mowiplus ® XW 330 | Celanese | Dispersing agent | 3 |
| 5 | Agitan ® 218 | Münzing | Defoamer | 3 |
| 6 | Dispersion per Ex. 3-4 or C3-C6 | | | 148 |
| 7 | Sodium hydroxide, 10% | | Base | 1.3 |
| 8 | White spirit | | Coalescent agent | 3 |
| 9 | Butyldiglycol acetate | | Coalescent agent | 3 |
| 10 | Kronos ® 2160 | Kronos | Titanium dioxide | 40 |
| 11 | Polyethylen FPE 930 T | Schwarzwälder Textil-Werke | HDPE fibers | 3 |
| 12 | MicaCelia 250 L | Imerys | Kaolin | 30 |
| 13 | Omyacarb ® 40 GU | Omya | Calcium carbonate | 130 |
| 14 | Omyacarb ® 130 GU | Omya | Calcium carbonate | 150 |
| 15 | Carolith ® 0.1-0.5 | Omya | Calcium carbonate | 120 |
| 16 | Carolith ® 1.5-2.0 | Omya | Calcium carbonate | 300 |

The liquid water transmission rate (w value) is a fundamental value in construction physics. The lower the w value, the higher the resistance of a coating against the permeability of water. The w values of the coatings were determined according to DIN EN 1062-3. Aerated concrete specimens (class P4-500 according to DIN EN 771-4, circular cylinder, disc area=0.0298 m$^2$) were pre-coated with a primer on one side and dried for 24 h. Façade paints, as per composition of Table 4, were homogeneously applied twice to achieve a wet coating weight of approx. 15 g (2×7.5 g). Plasters, as per composition of Table 5, were applied once. The lateral surfaces of the specimens were then sealed with liquefied paraffin (m.p.=58-60° C., AppliChem). The coated specimens were dried for 7 days at 23° C. and 50% relative humidity. Each specimen was weighed before its coated surface was immersed in DI water for 24 h (1$^{st}$ conditioning). After removing excess water, the gravimetric water uptake was determined by weighing the specimen after 30 min, 1 h, 3 h, 6 h, and 24 h. The specimens were then dried for 24 h at 45° C. in an oven with recirculating air. The described process of water immersion and drying was repeated twice (2$^{nd}$ and 3$^{rd}$ conditioning). After the 3$^{rd}$ conditioning, the specimens were stored at 23° C. and 50% relative humidity for at least 24 h (until achieving constant weight). The water absorption coefficient was determined by a fourth immersion of the coated surface in water for 24 h and weighing of the specimen after defined immersion times, as described above. The water permeability (in kg m$^{-2}$) at a given immersion time was calculated as the mass difference between the wet and dry specimen divided by the surface area of the coating. The $w_{24}$-value was then calculated by dividing the water permeability after 24 h by the square root of the immersion time.

Reported in Tables 6 and 7 are the actual $w_{24}$ values, as obtained after conditioning the specimens three times. Also reported are the liquid water transmission rates, as obtained during the initial immersion in water (1$^{st}$ conditioning). Similar to the first and second water uptake, the $w_{24}$ value obtained in the 1$^{st}$ conditioning is a measure of the water permeability of pristine coatings, while the actual $w_{24}$ value after three conditionings is a measure of the water permeability of aged coatings.

As can be inferred from the reported data, $w_{24}$ values of both pristine and aged inventive coatings are significantly lower than those values of the corresponding comparative coatings. Hence, the presence of acidic co-monomers in the second stage of the polymer binder imparts the coating with a resistance against water permeability if the first stage comprises a long chain vinyl ester. However, the presence of acidic co-monomers leads to a pronounced and unwanted increase of the w24 values if no long chain vinyl ester is present in the first stage polymer (cp. plaster C12 vs. plaster C11).

TABLE 6

Water absorption coefficients of the façade paints

| Paint | C7 | 7 | C8 | 8 |
|---|---|---|---|---|
| Dispersion as per Ex. | C1 | 1 | C2 | 2 |
| $w_{24}$, 1$^{st}$ conditioning (kg m$^{-2}$ h$^{-0.5}$) | 0.31 | 0.17 | 0.29 | 0.09 |
| $w_{24}$ (kg m$^{-2}$ h$^{-0.5}$) | 0.09 | 0.07 | 0.09 | 0.05 |

TABLE 7

Water absorption coefficients of the plasters

| Plaster | C9 | 9 | C10 | 10 | C11 | C12 |
|---|---|---|---|---|---|---|
| Dispersion as per Ex. | C3 | 3 | C4 | 4 | C5 | C6 |
| $w_{24}$, 1$^{st}$ conditioning (kg m$^{-2}$ h$^{-0.5}$) | 0.24 | 0.16 | 0.26 | 0.14 | 0.22 | 0.30 |
| $w_{24}$ (kg m$^{-2}$ h$^{-0.5}$) | 0.12 | 0.09 | 0.09 | 0.06 | 0.12 | 0.25 |

In summary, the presence of at least one hydrophilic acid co-monomer in the second phase and at least one long chain vinyl ester in the first phase imparts the polymer dispersions with a resistance against water whitening and leads to a decrease of the gravimetric water uptake. The increased hydrophobicity of such polymer dispersions also manifests in low water absorption coefficients of coatings which comprise these polymer dispersions as binders. On the other hand, the presence of at least one acidic co-monomer in the second phase without the presence of at least one long chain vinyl ester in the first phase deteriorates the hydrophobicity of the polymer dispersions, as evidenced by more pronounced water whitening and an increased $w_{24}$ value of coatings imparting such acid-containing dispersions.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. An emulsion polymerization process comprising:
   (i) polymerizing, in a first stage, a first monomer composition comprising from 50 weight percent to 95 weight percent of vinyl acetate, from 5 weight percent to 40 weight percent of at least one vinyl ester of a $C_5$ to $C_{18}$ unsaturated carboxylic acid, optionally up to 40 weight percent of ethylene, optionally up to 40 weight percent of at least one alkyl ester of acrylic acid, and optionally up to 20 weight percent of one or more further monomers copolymerizable therewith, all based on the total weight of monomers in the first monomer composition, to produce a first stage polymer; and
   (ii) polymerizing, in a second stage and in the presence of said first stage polymer, a second monomer composition comprising 40 weight percent to 89.95 weight percent of at least one alkyl ester of methacrylic acid or a vinyl aromatic monomer, 10 weight percent to 59.95 weight percent of at least one alkyl ester of acrylic acid, and from 0.05 weight percent to 10 weight percent of at least one comonomer with acid functionality, based on the total weight of monomers in the second monomer composition, to produce a second stage polymer, wherein the weight ratio of the first stage polymer to the second stage polymer is from 95:5 to 25:75.

2. The process according to claim 1, wherein the first stage polymer has a lower glass transition temperature, $T_g$, than the second stage polymer.

3. The process according to claim 1, wherein the glass transition temperature $T_g$ of the first stage polymer is at least 5° C., preferably at least 10° C., lower than the second stage polymer.

4. The process according to claim 1, wherein the first stage polymer has a $T_g$ less than 30° C., preferably from −15 to 25° C., more preferably from −5 to 15° C.

5. The process according to claim 1, wherein the second stage polymer has a $T_g$ of 5 to 90° C., such as from 15 to 80° C., preferably from 25 to 70° C.

6. The process according to claim 1, wherein the at least one vinyl ester of a $C_5$ to $C_{18}$ unsaturated carboxylic acid comprises a vinyl ester of a $C_7$ to $C_{15}$ branched chain unsaturated carboxylic acid.

7. The process according to claim 6, wherein the at least one vinyl ester of a $C_7$ to $C_{15}$ branched chain unsaturated carboxylic acid comprises a vinyl ester of a $C_9$ to $C_{11}$ branched chain unsaturated carboxylic acid.

8. The process according to claim 1, wherein the first monomer composition comprises from 5 weight percent to 40 weight percent ethylene, based on the based on the total weight of monomers in the first monomer composition.

9. The process according to claim 1, wherein the at least one ester of acrylic acid in the first monomer composition comprises ethyl acrylate, n-butyl acrylate, 2-octyl acrylate, 2-ethylhexyl acrylate, lauryl acrylate, and mixtures thereof.

10. The process according to claim 1, wherein the first monomer composition further comprises from 0.05 weight percent to about 5 weight percent of at least one monomer selected from the group consisting of ethylenically unsaturated sulfonic acids, ethylenically unsaturated phosphonic and phosphoric acids, ethylenically unsaturated carboxylic acids, ethylenically unsaturated carboxylic amides, ethylenically unsaturated carboxylic anhydrides and mixtures thereof, based on the total weight of monomers in the first monomer composition.

11. The process according to claim 1, wherein the first monomer composition further comprises from 0.05 weight percent to about 3 weight percent of at least one unsaturated silane monomer, based on the total weight of monomers in the first monomer composition.

12. The process according to claim 1, wherein the second monomer composition comprises at least 60 weight percent, preferably at least 80 weight percent, more preferably at least 90 weight percent, based on the total weight of monomers in the second monomer composition, of the at least one ester of acrylic acid and the at least one ester of methacrylic acid.

13. The process according to claim 1, wherein the second monomer composition contains less than 5 weight percent of any vinylaromatic monomer, based on the total weight of monomers in the second monomer composition, and preferably is free of any vinyl aromatic monomer.

14. The process according to claim 1, wherein the at least one ester of methacrylic acid in the second monomer composition comprises methyl methacrylate, ethyl methacrylate, butyl methacrylate, isobornyl methacrylate or mixtures thereof.

15. The process according to claim 1, wherein the at least one ester of acrylic acid in the second monomer composition comprises ethyl acrylate, n-butyl acrylate, 2-octyl acrylate, 2-ethylhexyl acrylate, lauryl acrylate, and mixtures thereof.

16. The process according to claim 1, wherein the second monomer composition comprises from 0.1 weight percent to 10 weight percent, preferably from 0.5 weight percent to 8 weight percent, more preferably from 1 weight percent to 6 weight percent, based on the total weight of monomers in the second monomer composition, of the at least one comonomer with acid functionality.

17. The process according to claim 1, wherein the at least one comonomer with acid functionality of the second monomer composition comprises at least one monomer selected from the group consisting of ethylenically unsaturated sulfonic acids, ethylenically unsaturated phosphonic and phosphoric acids, ethylenically unsaturated carboxylic acids, ethylenically unsaturated carboxylic anhydrides and mixtures thereof.

18. The process according to claim 1, wherein the at least one comonomer with acid functionality of the second monomer composition comprises at least one monomer selected from the group consisting of ethylenically unsaturated carboxylic acids, ethylenically unsaturated carboxylic anhydrides and mixtures thereof.

19. The process according to claim 1, wherein the at least one comonomer with acid functionality of the second monomer composition comprises methacrylic acid, acrylic acid, or mixtures thereof.

20. An emulsion polymerization process according to claim 1, wherein the second monomer composition further comprises from about 0.05 weight percent to about 5 weight percent, based on the total weight of monomers in the second monomer composition, of an ethylenically unsaturated carboxylic amide.

21. A polymer dispersion produced by the process of claim 1.

22. The polymer dispersion of claim 21 and having a minimum film forming temperature of less than 20° C., preferably less than 10° C., more preferably equal or less than 6° C.

23. The polymer dispersion of claim 21, wherein the particles of the polymer dispersion have a weight-averaged diameter of less than 200 nm, preferably less than 150 nm, as measured by laser diffraction and polarization intensity differential scattering (PIDS) using a Beckman Coulter LS 13320 Particle Size Analyzer.

24. A coating composition comprising the polymer dispersion of claim 21, at least one pigment and/or at least one filler.

25. The coating composition of claim 23, wherein the coating is a wood protection paint.

26. The coating composition of claim 23, wherein the coating is a façade paint.

27. The coating composition of claim 23, wherein the coating is a plaster.

28. A coating produced from the coating composition of claim 23 and having a liquid water transmission rate $w_{24}$ of less than 0.1 kg $m^{-2}h^{-0.5}$ as measured according to DIN EN 1062-3.

29. A coating produced from paint composition of claim 23 and having a liquid water transmission rate $w_{24}$ of less than 0.2 kg $m^{-2}h^{-0.5}$ during the initial immersion in water, as measured according to DIN EN 1062-3.

30. A thermal insulation system comprising the plaster composition of claim 27.

* * * * *